(12) United States Patent
Kranzler et al.

(10) Patent No.: US 6,425,684 B1
(45) Date of Patent: Jul. 30, 2002

(54) VEHICLE LIGHTING UNIT WITH AN OPTICAL CONDUCTOR SYSTEM

(75) Inventors: Thomas Kranzler, Salem; Andreas Leupolz, Horgenzell; Alfred Ott, Gaufelden; Werner Scherber, Bermatingen; Stefan Uhl, Stuttgart, all of (DE)

(73) Assignee: DaimlerChrysler, AG, Stuttgart (DE)

( * ) Notice: Subject to any disclaimer, the term of this patent is extended or adjusted under 35 U.S.C. 154(b) by 0 days.

(21) Appl. No.: 09/607,407

(22) Filed: Jun. 30, 2000

(30) Foreign Application Priority Data

Jul. 6, 1999 (DE) .......................... 199 31 008

(51) Int. Cl.[7] ................................................ F21V 9/00
(52) U.S. Cl. .................... 362/551; 362/31; 362/511; 362/558
(58) Field of Search ................. 362/551, 558, 362/507, 31, 511, 552, 246

(56) References Cited

U.S. PATENT DOCUMENTS 5,422,792 A * 6/1995 Neumann .................... 362/32

FOREIGN PATENT DOCUMENTS

DE 196 13 211 A1 11/1996

* cited by examiner

*Primary Examiner*—Stephen Husar
*Assistant Examiner*—John Anthony Ward
(74) *Attorney, Agent, or Firm*—Crowell & Moring LLP

(57) ABSTRACT

The invention relates to a vehicle lighting unit with an optical conductor system, having a light source and means for concentrating the beams of this source onto the entrance end of a transparent rod, the rod extending along a longitudinal axis A and having obliquely relative to the longitudinal axis a plurality of reflecting facets at which light emerges at a specific intensity, the facets cooperating with optical lenses which are arranged at the exit of an optical conductor in the path of the elementary light bundles reflected by the facets.

Figure 1:
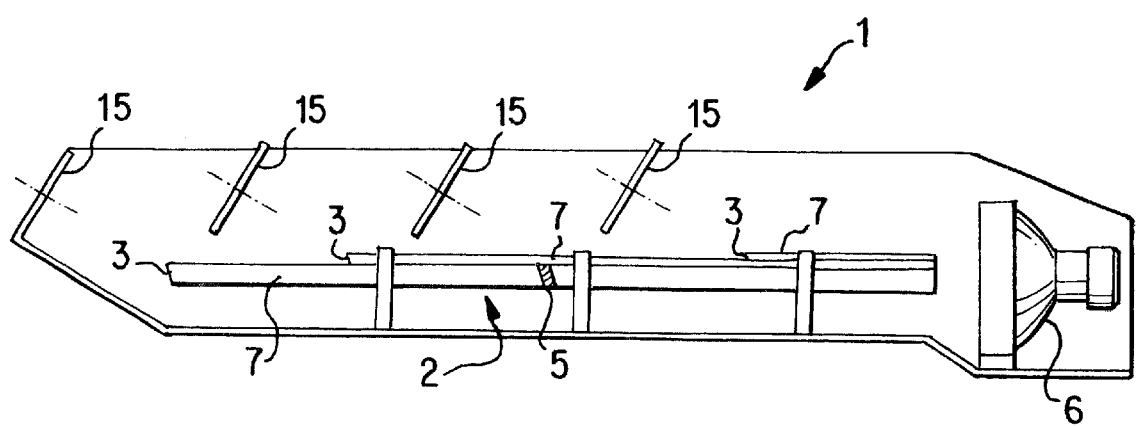

According to the invention, it is provided that light-controlling elements are present which permit the deflection or passage of light by changing thereflection at the facet.

7 Claims, 3 Drawing Sheets

VEHICLE LIGHTING UNIT WITH AN OPTICAL CONDUCTOR SYSTEM

The invention relates to a vehicle lighting device with an optical conductor system in accordance with the generically determinative features of Claim 1.

A vehicle lighting unit with an optical conductor system is disclosed in DE 196 13 211 A1. This device has a light source whose light is focused into an optical rod. At specific points, light is coupled out of the rod by means of reflecting facets and guided by optical lenses onto the desired lighting field. The longitudinal axis of the optical conductor forms an acute angle relative to the facets, the inclination of the facets being dimensioned such that total reflection occurs at the facets.

In the case of this type of lighting system, it is disadvantageous that the arrangement of the facets with the assigned optical lenses permanently prescribes the resulting light distribution. This prescription determines the characteristic of the headlamp. The possibilities for changes to the light distribution are greatly limited.

In order to influence the light distribution, it is conceivable for there to be present in the light transmission controllable elements which are fitted, for example, between the light source and rod or upstream of the respective lens. In addition to mechanical shutters, it seems particularly attractive to use electrochromic elements which can be switched between transparent and absorbing by applying an electric voltage, and thus serve to control the light distribution of the individual facets. However, such elements can be used only in a limited way, since they heat up very strongly in the darkened state and it is not possible to use the dipped light fraction. Controlling the light distribution via a reflection principle is therefore to be preferred in every case.

The object of the invention is to improve a light system so as to permit the light distribution to be changed simply and quickly in the case of vehicle headlamps, in particular the light distribution on the road.

According to the invention, the object is achieved by the features of Claim 1. Advantageous refinements and developments of the subject-matter of the invention are characterized by the features of the subclaims.

A substantial advantage of these refinements consists in that a multiplicity of light distributions on the road are rendered possible by changing individual light-controlling elements. Thus, even quick changes of light distribution on the road are possible when, for example, the aim is to switch over from dipped beam to main beam, or when the aim is to implement a different light distribution such as, for example, a cornering light.

Figure 2:
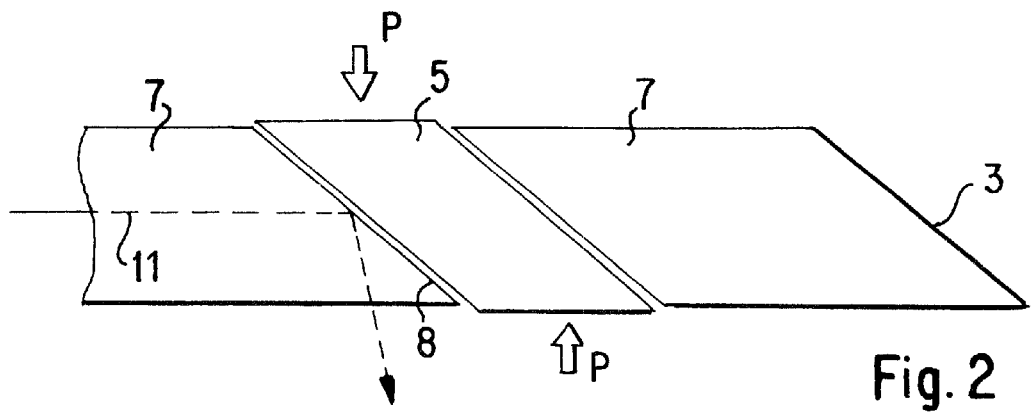
Figure 2A:
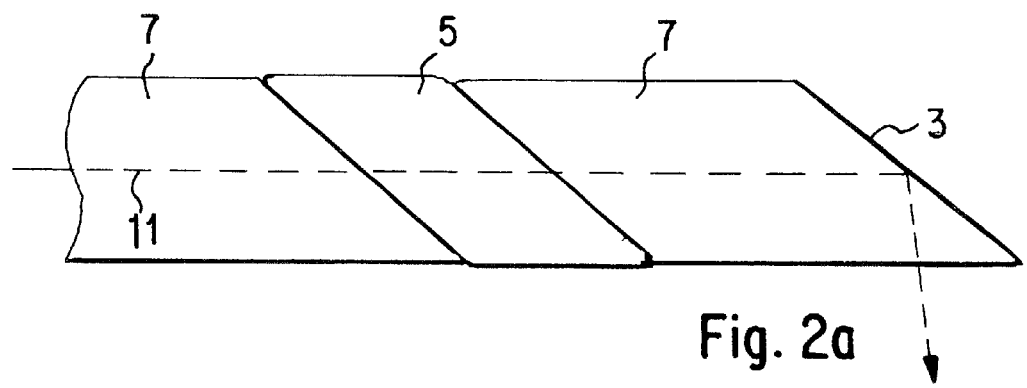
Figure 3:
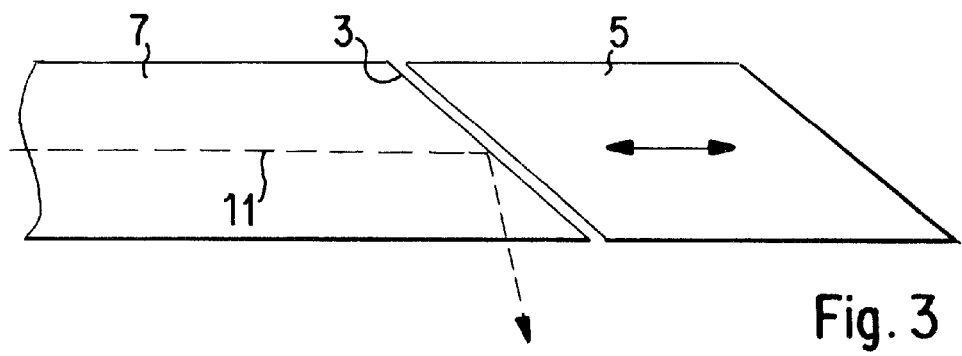
Figure 3A:
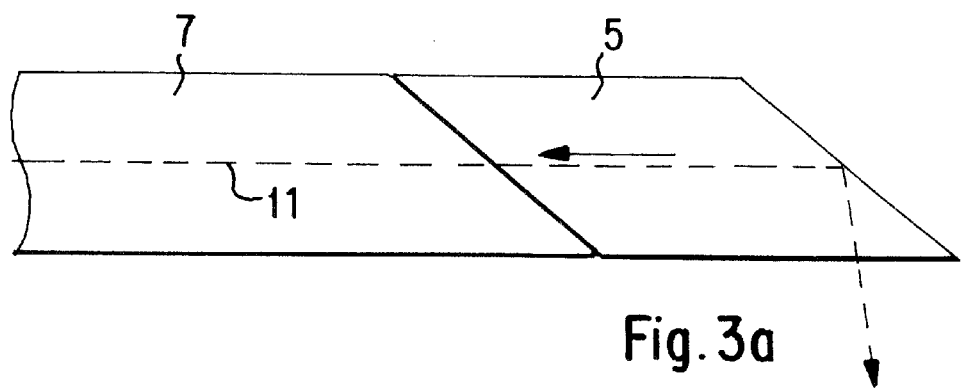
Figure 4:
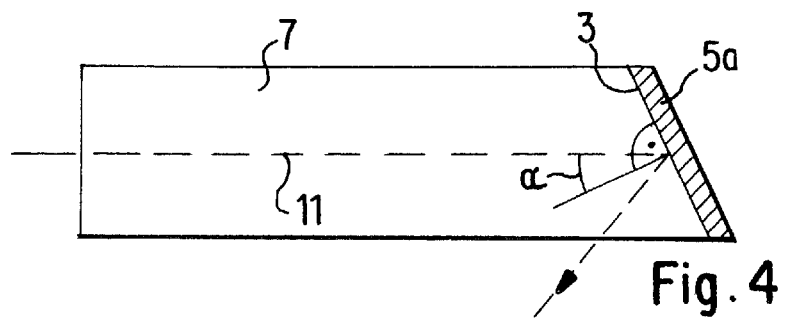
Figure 4A:
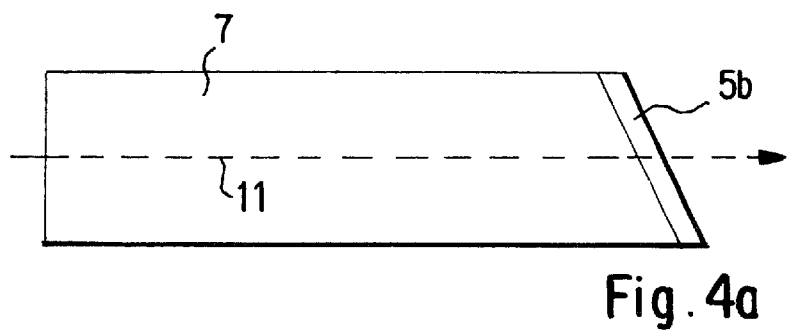
Figure 5:
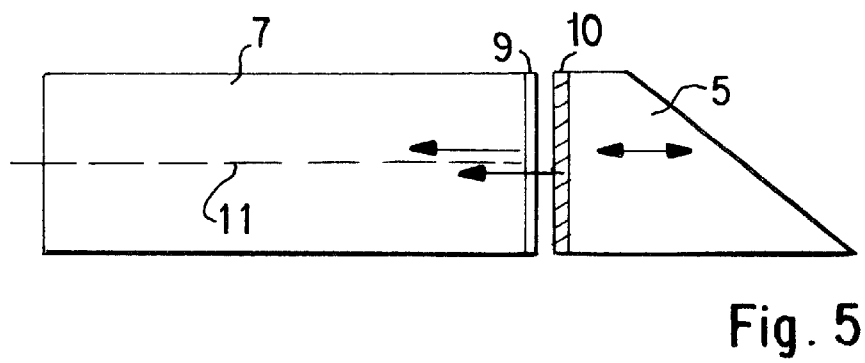
Figure 5A:
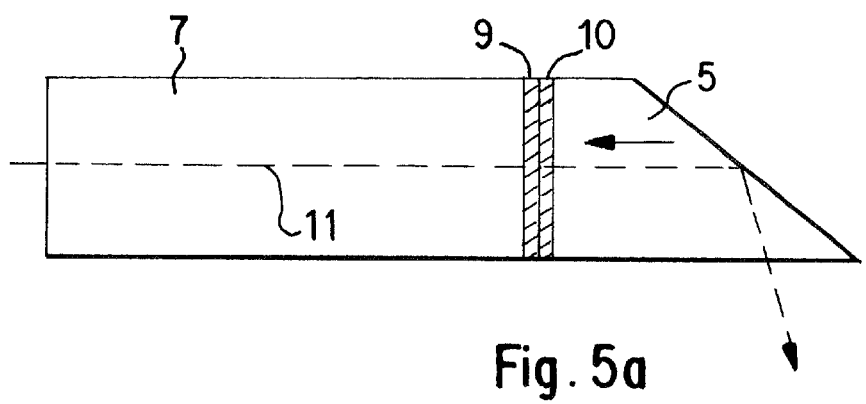

The invention is explained in more detail with the aid of an exemplary embodiment in conjunction with a description of the figures, in which:

FIG. 1 shows a diagrammatic illustration of a vehicle lighting unit with a light-conducting system comprising an optical rod, and FIG. 2 shows a diagrammatic illustration of a section of an optical rod with a light-controlling element, FIG. 3 shows a further diagrammatic illustration of a section of an optical rod with a light-controlling element, and FIG. 4 shows a further diagrammatic illustration of a section of an optical rod with a light-controlling element, and FIG. 5 shows a further diagrammatic illustration of a section of an optical rod with a light-controlling element.

FIG. 1 shows a diagrammatic illustration of a vehicle lighting unit 1 with an optical conductor system, in particular for a headlamp of a vehicle, the vehicle lighting device 1 having a light source 6 which reflects the light into an optical rod 2 in a parallelized fashion. The light is passed on by the optical rod 2, constructed from optical conductors 7, is reflected at the facets 3, the facets cooperating with optical lenses 15 which are arranged at the exit of an optical conductor 7 in the path of the elementary light bundles reflected by the facets 3, and subsequently emerges from the optical conductors 7. The light-controlling elements 5 can be integrated into the optical conductor 7 (as in FIG. 2) and/or be connected directly on or at the facet 3 (as in FIG. 3). Depending on the control state of the light-controlling element 5, light is deflected or passes through, such that the light distribution surface on the road is changed in this way. The various light distribution surfaces form the headlamp light. Thus, various headlamp settings can be implemented by the correct connection. The light distribution on the road can be controlled as the situation demands using this control mechanism. The cornering light which adapts itself to the road in accordance with the bend, or else headlamp control which uses local information from satellite navigation systems can be implemented thereby simply and accurately. In order to control the headlamp light, a control unit is provided which controls the light transmission and light absorption or light reflection of the light-controlling elements so as to produce a prescribed light distribution on the road.

FIG. 2 shows a diagrammatic illustration of a section of an optical conductor 7 with a light-controlling element 5. The light-controlling element 5 is inserted at oblique angles into the part of the optical conductor 7 which lights the facet 3. The light-controlling element 5 interrupts the optical conductor rod 7 by gaps at a slight spacing. The result is to form at the first break a new facet 8 at which the light is directed into a different direction by total reflection. The light can be used for other purposes, for example by fitting a lens at this position. The gaps are closed by attaching the element 5 at both ends to the optical conductor rod 7. Since the light-controlling element has a similar optical density to that of the optical conductor 7, no further reflection occurs at the interface. The light can pass along the rod undiminished through the element 5 and light the original facet 3. Siloxanes, polyurethanes or other polymers which are highly transparent and elastic can, for example, be used for the light-controlling element. A highly flexible surface is required in order to achieve optically acceptable coupling despite surface roughness of the interfaces.

One possibility for implementing the switching operation consists in effecting a thickening of the longitudinal extent by compression of the element in the transverse direction, and thus in bridging the gaps. As a further design, it is also possible to use polymers which are caused to swell by organochemical vapours, expand in the process and then adjoin the interface 8 to the optical conductor 7 and permit light to pass. It is also possible to provide a cuvette which is arranged at or in the optical conductor 7 and into which liquid with a refractive index which permits the passage of light is filled and drained again. A cuvette filled with liquid then permits the passage of light.

In FIG. 3, the optical conductor 7 is lengthened at the facet 3 by the light-controlling element 5. A gap is opened and closed by displacing the light-controlling element 5 along the longitudinal axis. With the gap opened, total reflection occurs at the facet 3, and the light beam is reflected. With the gap closed, the light beam enters the light-controlling element and can be used at another point. The same materials as in FIG. 2 are used for the light-controlling element. In an alternative design, the element 5 consists of glass, and only the surface which is pressed onto the facet 3 is coated with a soft plastic.

The light-controlling element 5 is arranged in FIG. 4 at the end of the optical conductor 7. However, the facet 3 is designed at an angle a which is smaller than the critical angle of total reflection. Arranged on the facet 3 is the light-controlling element 5, whose optical properties can be switched over between high reflection 5a and high transmission 5b by means of an electric voltage. In the reflecting state of the element 5a, the light is deflected and can be directed onto a lens. If the light-controlling element 5b is transparent, the light 11 leaves the optical conductor 7 and can be used otherwise. If the light-controlling element 5 is arranged in the optical conductor 7, the transmitted light bundle 11 is passed on in the optical conductor 7.

As another design, the refractive index of the light-controlling element 5 can be changed to a specific extent. If the angle $\alpha$ is selected such that it corresponds precisely to the critical angle of total reflection, it is possible to switch over from the totally reflecting state with light deflection to the state with high light transmission by slightly changing the refractive index.

A further design of a light-controlling element 5 arranged at the end of an optical conductor 7 is shown in FIG. 5. The possibility of switching over the element between high reflection and high transmission is achieved with the aid of an interference approach. The end of the optical conductor 7, and the surface of a movable element 5 are coated 9 or 10 with optically transparent, preferably highly refracting materials (for example $TiO_2$ or $ZrO_2$). The optical coating thickness is designed in this case, for example, such that there is maximum reflection of the individual coatings for the optical wavelength which corresponds to the maximum eye response ($\lambda$=550 nm). These so-called $\lambda/4$ coatings 9 and 10 are moved, for example, with the aid of a mechanical switching mechanism. Retroreflection, and thus masking out of a light beam 11 occur when both $\lambda/4$ coatings 9 and 10 are separated by a narrow gap, as represented above at the side. By moving the second $\lambda/4$ coating 10 onto the first $\lambda/4$ coating 9, the light-controlling element 4 becomes transmissive to light 11, since both coatings act optically to effect a reduction in reflection ($\lambda/2$ coating) by destructive interference, and can, for example, be coupled out through a subsequent facet.

What is claimed is:

1. An optical conductor system for a lighting unit comprising:
    a light source;
    means for concentrating beams of said source onto an entrance end of a transparent rod wherein said rod extends along a longitudinal axis and said rod includes at least one optical conductor and a plurality of reflecting facets positioned obliquely relative to said longitudinal axis wherein light emerges at a specific intensity;
    at least one optical lens optically cooperating with a respective one of said facets wherein said at least one lens is arranged at the exit of a respective one of said at least one optical conductor in the path of elementary light bundles reflected by said at least one said facet; and
    at least one light-controlling elements wherein each one of said at least one light-controlling element controls the deflection or passage of light by changing the reflection at a respective one of said at least one facet.

2. The optical conductor system according to claim 1, wherein each of said light-controlling elements is made from a transparent highly flexible material similar to the optical conductor and wherein each said light controlling element is arranged within a section of one of said at least one optical conductor with a small slit spacing between said conductor and said flexible material of said light controlling element and wherein said slit spacing is at an angle at which total reflection occurs and wherein said light controlling element is thickened in the transverse direction and extends in the longitudinal direction to close the slit as a function of compression of said element.

3. The optical conductor system according to claim 1, wherein said at least one the light controlling element is arranged at the facet with a small slit spacing between the facet and the light-controlling element and the said slit spacing is at an angle at which total reflection occurs and wherein couplings to the optical conductor occurs without a gap by movement on the longitudinal axis for the passage of light.

4. The optical conductor system according to claim 1, wherein at least one of said facets has an angle □ which is smaller then a critical angle of total reflection and wherein an element is positioned on the facet wherein the optical properties of the element can be switched between high reflection and high transmission.

5. The optical conductor system according to claim 1, wherein two interference coatings attached to one another and said optical conductor form a light controlling element wherein light is retroreflected into the optical conductor with a $\lambda/2$ coating with a high transparency being produced when said coatings are attached to one another.

6. The optical conductor system according to claim 1, wherein the surface of the facet is coated with a material whose reflective index is variable so that the critical angle of total reflection is undershot or overshot so that a light bundle is totally reflected and deflected or coupling out of the optical conductors performed in the direction of the longitudinal axis and wherein said surface of the facet coated with said material forms a light-controlling element.

7. The optical conductor system according to claim 2, wherein said compression of the light-controlling element is performed by piezoceramic actuators.

\* \* \* \* \*